US006521868B1

(12) United States Patent
Kyrtsos et al.

(10) Patent No.: US 6,521,868 B1
(45) Date of Patent: Feb. 18, 2003

(54) METHOD AND APPARATUS FOR HEATING A PORTION OF A VEHICLE

(75) Inventors: Christos Kyrtsos, Southfield, MI (US); Kenneth Gerard Brown, St. Clair Shores, MI (US); Eric Gerd Schaefer, Farmington Hills, MI (US); George Anderson, Taylor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,947

(22) Filed: Nov. 2, 2001

(51) Int. Cl.[7] ................................................ B60L 1/02
(52) U.S. Cl. ...................................... 219/203; 219/202
(58) Field of Search ................................ 219/203, 522, 219/480, 478, 508, 202, 207, 205; 52/171.2

(56) References Cited

U.S. PATENT DOCUMENTS

| | | | | | |
|---|---|---|---|---|---|
| 1,758,703 | A | * | 5/1930 | Johnson | 219/547 |
| 2,530,980 | A | * | 11/1950 | Mershon | 219/486 |
| 2,866,881 | A | * | 12/1958 | McMillen | 219/522 |
| 3,475,588 | A | * | 10/1969 | McMaster | 219/203 |
| 3,790,745 | A | * | 2/1974 | Levin | 219/203 |
| 3,832,527 | A | | 8/1974 | Nagasima | |
| 3,982,092 | A | * | 9/1976 | Marriott | 219/203 |
| 4,127,763 | A | * | 11/1978 | Roselli | 219/203 |
| 4,357,524 | A | | 11/1982 | Apfelbeck et al. | |
| 4,513,196 | A | | 4/1985 | Bartelsen et al. | |
| 4,539,466 | A | | 9/1985 | Yamamoto | |
| 4,725,710 | A | | 2/1988 | Ramus et al. | |
| RE33,343 | E | * | 9/1990 | Bitter et al. | 219/509 |
| 4,971,848 | A | | 11/1990 | Ruelle et al. | |
| 4,985,671 | A | | 1/1991 | Sauer | |
| 5,072,098 | A | * | 12/1991 | Matthews et al. | 219/501 |
| 5,121,321 | A | | 6/1992 | Sasaki et al. | |
| 5,170,040 | A | | 12/1992 | Wirtz et al. | |
| 5,182,431 | A | | 1/1993 | Koontz et al. | |
| 5,451,822 | A | | 9/1995 | Bechtel et al. | |
| 5,831,244 | A | | 11/1998 | Springer et al. | |
| 6,100,500 | A | * | 8/2000 | Jefferson et al. | 219/203 |
| 6,163,013 | A | * | 12/2000 | King et al. | 219/203 |

OTHER PUBLICATIONS

Search Report conducted on Aug. 10, 2001 by the Law Offices of John Chupa & Associates, P.C.

* cited by examiner

*Primary Examiner*—Teresa Walberg
*Assistant Examiner*—Vinod D. Patel
(74) *Attorney, Agent, or Firm*—Raymond L. Coppiellie

(57) ABSTRACT

A method and an apparatus 12 for quickly heating a portion of a vehicle 10, such as a windshield 22 or backwindow 20. Particularly, apparatus 12 includes several conductors 40 which are coupled to electrical ground potential 42 and which have opposed ends 44, 46 which are alternatingly coupled to a source of energy 26, thereby allowing the portion of the vehicle 10 to be quickly heated.

20 Claims, 4 Drawing Sheets

METHOD AND APPARATUS FOR HEATING A PORTION OF A VEHICLE

BACKGROUND OF INVENTION (1) Field of the Invention

The present invention generally relates to a method and an apparatus for heating a portion of a vehicle and more particularly, to a method and an apparatus for quickly and efficiently heating a window of a vehicle.

(2) Background of the Invention

It is desirable to selectively heat or defrost a window of a vehicle, particularly the portion of the window or windshield in front of the driver and the backwindow, in order to remove any ice, frost and/or snow which may respectively form or be deposited upon these windows, thereby allowing the driver and occupants to view the surrounding area and allowing the driver to thereafter navigate or maneuver the vehicle. Moreover, it is further desirable to quickly defrost these windows in order to allow the vehicle to be driven shortly after entry of the driver and passengers, thereby reducing the amount of wasted fuel and energy which is expended while the vehicle is activated or running, but remains stationary while the windows are being cleared or cleaned.

One strategy to quickly heat and clear a window is to provide a relatively large amount of energy or power to the entire window in a relatively short amount of time. While this strategy does allow the window to be quickly defrosted, it typically requires more energy than is usually supplied by or is available from a conventional vehicular battery and/or charging system, especially when one considers the relatively large energy requirements of the relatively large variety of assemblies which are now commonly and often concurrently used within a vehicle. Hence, the implementation of this entire window quick heating strategy typically uses a relatively large amount of power, requiring a relatively high voltage battery (e.g., a battery having in excess of the voltage provided by a conventional vehicular battery) and relatively heavy or bulky wires to communicate the relatively large electrical current produced by the battery and/or charging system to various portions of the vehicle, thereby also undesirably increasing overall cost and maintenance. This strategy may also be impractical, in many vehicular configurations, due to a lack of packaging or mounting space within the vehicle.

The present invention allows a vehicular window to be quickly and selectively heated in a manner which overcomes these previously delineated drawbacks and in a manner which is more particularly set forth below.

SUMMARY OF INVENTION

It is a first non-limiting advantage of the present invention to provide a method and an apparatus for defrosting a window of a vehicle in a manner which overcomes some or all of the previously delineated drawbacks of prior strategies.

It is a second non-limiting advantage of the present invention to provide a method and an apparatus for quickly and efficiently defrosting a window of a vehicle in a manner which overcomes some or all of the previously delineated drawbacks of prior strategies and which, by way of example and without limitation, does so by use of a conventional vehicular battery.

It is a third non-limiting advantage of the present invention to provide a method and an apparatus for quickly and efficiently heating a window of a vehicle in a manner which overcomes some or all of the previously delineated drawbacks of prior strategies and which, by way of example and without limitation, increases the amount of heat which is conventionally applied to a vehicular window without concomitantly requiring an increase in the energy capacity provided by a conventional vehicular battery assembly.

It is a fourth non-limiting advantage of the present invention to provide a method and an apparatus for operating at least two selectively energizable vehicular assemblies in an efficient and alternating manner.

According to a first non-limiting aspect of the present invention, an apparatus for heating a window of a vehicle is provided. The apparatus has a first portion which heats a first part of the window; and a second portion which heats a second part of the window.

According to a second non-limiting aspect of the present invention, an assembly is provided for use with a window of a vehicle. The assembly includes a plurality of conductors which heatingly communicate with a portion of the vehicle, each of the plurality of conductors being coupled to an electrical ground potential and including a respective first portion which selectively receives energy and which produces heat by use of the energy; and a respective second portion which selectively receives energy only when the communication of the energy to the first portion is interrupted.

According to a third non-limiting aspect of the present invention a method is provided for heating a vehicular window. The method comprises the steps of heating a first portion of the window; and heating a second portion of the window after the first portion has been heated.

These and other features, aspects, and advantages of the present invention will become apparent from a reading of the following detailed description of the preferred embodiment of the invention and by reference to the following drawings.

DETAILED DESCRIPTION

Figure 1:
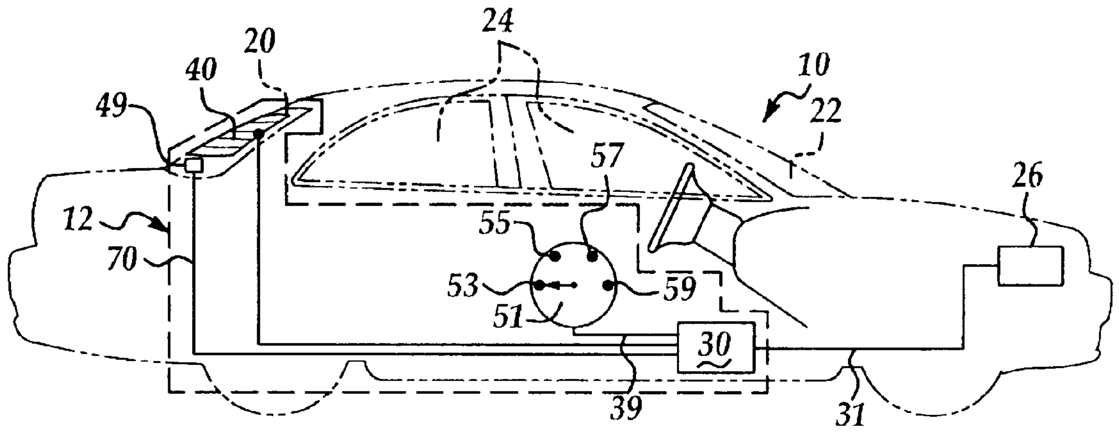
FIG. 1 is a block diagram of the apparatus of the preferred embodiment of the invention deployed within a vehicle.
Figure 2:
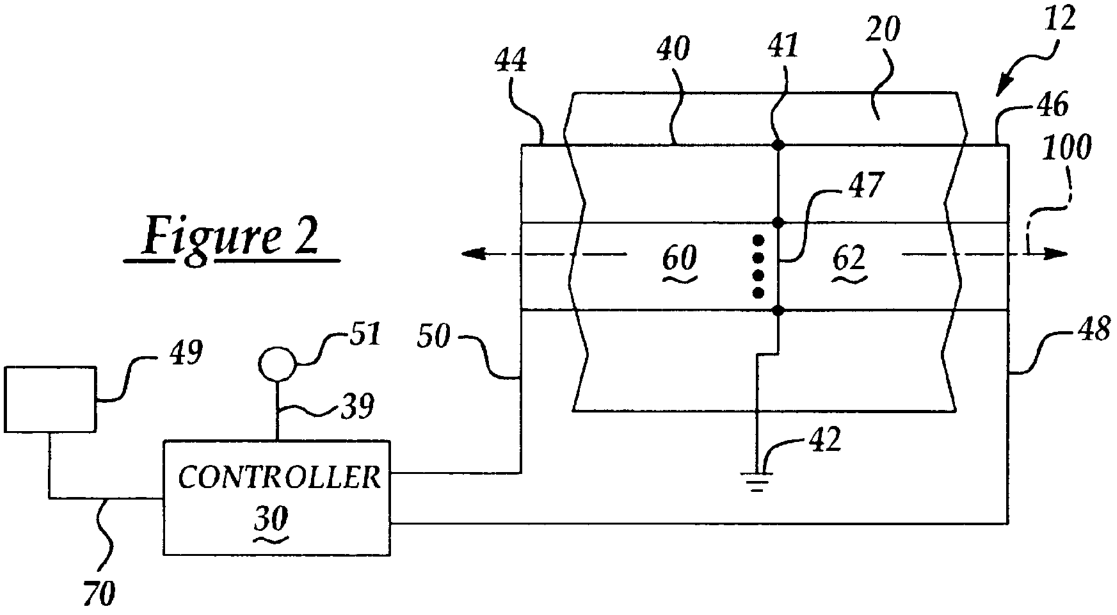
FIG. 2 is an electrical schematic diagram of the apparatus of the preferred embodiment of the invention which is shown in FIG. 1.

Referring now to FIGS. 1 and 2, there is shown a vehicle 10 which includes a heating or defrosting apparatus 12 which is made in accordance with the teachings of the preferred embodiment of the invention.

As shown, vehicle 10 is of the type having a back or rear window 20, a windshield 22, several side windows 24, and a conventional vehicular energy storage assembly or battery 26 having a voltage of about 12 volts. While the operation of the assembly 12 is described below with reference to the backwindow 20, it should be appreciated that the apparatus 12 may be operatively deployed upon/within the windshield 22 and/or upon/within any or all of the several side windows 24, and that the term window or vehicular window, as used in this description, means any and all of the side windows 24, windshield 22, and backwindow 20. Hence, the operation of apparatus 12 with respect to the back window 20 is substantially similar to the operation of the apparatus 12 with respect to all of the other windows 22, 24. Moreover, it should be appreciated that the voltage of battery 26 is exemplary and that other voltages may be utilized and/or the battery 26 may be replaced with a fuel cell or substantially any other type of energy generation apparatus. Furthermore, it should be appreciated that vehicle 10 may comprise a conventional and commercially available vehicle into which the assembly 12 has been operatively disposed and that nothing in this description is meant to limit the applicability of the invention to a particular type of vehicle.

As shown best in FIGS. 1 and 2, apparatus 12 includes a controller 30 which operates under stored program control and which is physically and communicatively coupled to the battery or energy source 26 by bus 31. It should be appreciated that controller 30 may be replaced by any other programmable control device (e.g., a discrete logic type of device) and that nothing in this description is meant to limit the invention to use with such a controller 30 which operates under stored program control. In one non-limiting embodiment of the invention, controller 30 may comprise a conventional vehicle controller, such as but not limited to a climate controller, having additional software to perform the functionality and methodology of the invention. Assembly 12 further includes several electrical conductors or selectively energizable elements (e.g., wires, film, or conductive traces) 40 which are disposed upon or which are operatively embedded within the backwindow 20. In one non-limiting embodiment, conductors 40 may comprise conventional and commercially available wires, film, or traces which are currently used to selectively defrost a vehicular window. Such wires or traces may also be utilized on the windshield 22 and/or upon the windows 24 as previously explained and, as best shown in FIG. 2, conductors 40 form a selectively energizable grid or array.

In one non-limiting embodiment of the invention, conductors 40 are substantially and linearly co-extensive with the backwindow 20 and in one non-limiting embodiment of the invention, conductors 40 are substantially identical, although they are not necessarily required to be identical. Further, each of the conductors 40 is coupled, at a respective location or ground point 41, to electrical ground potential 42, and each of the conductors 40 have respective opposed ends 44, 46 which are physically and communicatively coupled to the controller 30. Particularly, in one non-limiting embodiment of the invention, the ends 46 cooperatively form a bus 48 which is physically and communicatively coupled to the controller 30, and the ends 44 cooperatively form a bus 50 which is also physically and communicatively coupled to the controller 30. Further, each respective ground point 41 is physically coupled to electrical ground potential 42 by bus 47. As best shown in FIG. 2, bus 50, conductors 40 and bus 47 cooperatively form a first relatively small conductive portion 60, while bus 48, conductors 40, and bus 47 cooperatively form a second relatively small conductive portion 62 (i.e., portions 60 and 62 "divide" backwindow 20 into two relatively small halves or portions). In one non-limiting embodiment, each of the portions 60, 62 are substantially identical, although in other embodiments of the invention, portions 60, 62 may be dissimilar in size and/or shape.

Assembly 12 further includes a selectively movable switch 51 which is physically and communicatively coupled to the controller 30 by bus 39 and which may be selectively moved from a first deactivated position 53 to a plurality of alternate positions. For example and without limitation, switch 51 may include a second position 55, a third position 57, and a fourth position 59. The controller 30 senses the position 53–59 of the switch 51 and performs certain operations which depend upon the sensed switch position 53–59 and the program/instructions included within the controller 30. The operation of the assembly 12 will now be explained with respect to backwindow 20.

In operation, when the switch 51 is placed in the deactivated position 53, substantially no energy is communicated to the backwindow 20 (i.e., no energy is communicated to portions 60, 62). When the switch 51 is moved to position 55, controller 30 causes electrical power to be communicated from the battery 26, to the bus 50, thereby allowing the portion 60 to be heated. That is, the communicated electrical current flows through the bus 50, through ends 44 of each of the conductors 40, and to the respective ground points 41 and the electrical ground potential 42. These portions of the conductors 40 which reside within and which form the conductive portion 60 therefore heat and defrost that portion of the backwindow 20 which includes or which is otherwise in operative contact with portion 60. The electrical energy which may have been communicated to bus 48 is also interrupted when the switch 51 is moved to position 55.

When the switch 51 is moved to position 57, controller 30 causes electrical power to be communicated from the battery 26 to the bus 48, thereby allowing conductive portion 62 to be energized and to provide heat. That is, the communicated electrical current flows through the bus 48, through ends 46 of the conductors 40, and to the respective "ground points" 41 and the ground potential 42. These portions of the conductors 40 which reside within and which form the conductive portion 62 heat and defrosts that portion of the backwindow 20 which includes or which otherwise in operative contact with portion 62.

The foregoing strategy of heating relatively small areas of the backwindow 20 allows the entire backwindow 20 to be quickly heated since the entire amount of power communicated to the controller 30 and supplied by the battery 26 is applied to only one of the relatively small areas or portions at any time.

The heating efficiency of this strategy was verified by an experiment conducted on a Year 2001 model of a FOCUS type vehicle which is manufactured by the Ford Motor Company of Dearborn, Mich. Particularly, the vehicle was placed in a climate controlled chamber for about twelve hours. The climate controlled chamber provided a temperature of 0 degrees Fahrenheit and a wind speed of approximately 5 mph (i.e., the initial vehicular placement time is referred to as "the soaking time"). A thin layer of water was then deposited upon the backwindow of the vehicle and the vehicle was allowed to "soak" for an additional 30 minutes within the climate controlled chamber to allow the deposited water to form a layer of ice or frost upon the backwindow of the vehicle. Approximately 12.8 volts and 20 amps of electrical energy were supplied to a conventional conductor arrangement which traversed substantially the entire backwindow of the vehicle in the traditional manner. The backwindow was defrosted in about thirty-five minutes.

The test was repeated with the voltage across the conductors (i.e., referred to as "grid voltage") increased to about 18.1 volts to simulate the effect of doubling the power to the entire backwindow or equivalently using the same power (i.e., the power derived from 12.8 volts) over half of the backwindow. That is, it is known by Joule's Law that the electrical power is equal to the square of the provided voltage divided by resistance. Hence, according to this law, a voltage of 18.1 volts provides almost double the power which is provided by a voltage which is 12.8 volts over the same electrical resistance. The backwindow was defrosted in about seven minutes when the utilized grid voltage was tested at 18.1 volts. Hence, the defrosting time was reduced by a factor of five (from thirty-five minutes to seven minutes) which is a significantly larger amount than the number of portions that need to be defrosted (e.g., such window portions corresponding to heating portions 60, 62).

More specifically, as demonstrated above, if an amount of power (e.g., from a conventional vehicular 12.8 volt battery) is applied to one half of the backwindow 20, then half of the backwindow 20 will defrost five times faster than the time required to defrost the entire backwindow 20 by use of the provided power and therefore, the entire backwindow 20 may be defrosted in about two-fifths of the amount of time which would be required to defrost the entire backwindow 20 by applying the same power in a conventional manner to one conductor array or assembly which traverses the entire backwindow 20 (i.e., separately defrosting two halves of the backwindow 20 takes approximately 14 minutes instead of the 35 minutes required if both portions were concurrently defrosted in a conventional manner). Hence, the use of apparatus 12 allows a savings of about 60% of the energy required to accomplish the same defrosting task to be realized (i.e., by defrosting the entire backwindow 20 in about 40% of the time). In other non-limiting embodiments of the invention, the backwindow 20 may be segmented into three or more such portions or segments.

When the switch 51 is moved to the fully activated position 59, (e.g., when it is desired to defrost substantially the entire backwindow 20), the controller 30 physically and communicatively couples the bus 48 to the battery or energy source 26 (e.g., allowing energy to be sourced from battery 26 to the bus 48) for a certain first predetermined period of time and then interrupts or substantially prevents the battery or energy source 26 from communicating with the bus 48 while causing the bus 50 to be similarly, physically, and communicatively coupled to the battery or energy source 26 for a second predetermined period of time.

In the most preferred, although non-limiting, embodiment of the invention, the first and second predetermined periods of time are substantially identical. However, in other non-limiting embodiments, the first and second predetermined periods of time may be disparate. After the second predetermined period of time has expired, the controller 30 then physically and communicatively couples the bus 48 to the battery or energy source 26 for a period of time which is substantially equal to the first predetermined period of time, while interrupting or terminating the communication between the bus 50 and the battery or energy source 26. Hence, in the foregoing manner, the controller 30 alternatively couples the busses 48 and 50 to the energy source 26 until the backwindow 20 has been substantially defrosted (e.g., each such alternating coupling continues for a third predetermined period of time) or until a sensor, such as temperature sensor 49, which is deposed upon backwindow 20 and which is coupled to the controller 30 by bus 70, determines that the backwindow 20 has attained a certain desired temperature and communicates this information to the controller 30.

In an alternate non-limiting embodiment, controller 30 may estimate the temperature of backwindow 20 by determining the actual electrical resistance of the coupled array or grid of conductors 40 (the grid resistance) by measuring the electrical current which is being applied or which is being communicated to the apparatus 12 for a certain applied voltage. The grid resistance may then be compared to a database or matrix stored within controller 30 which contains known or previously determined grid resistance values over a range of temperatures for a certain applied voltage (e.g., the resistance value of the grid varies with temperature in a known or easily calibratable manner).

In yet another alternate non-limiting embodiment, another temperature sensor, which may be substantially similar to temperature sensor 49, may be disposed upon the rear window 20, or substantially any other window 22, 24, or any other desired location within or outside of the vehicle 10 and is communicatively coupled to the controller 30. This temperature sensor then measures the ambient temperature of the environment that the vehicle 10 is disposed within and controller 30 uses this information to determine whether assembly 12 should be activated. For example, if the measured ambient temperature is at least seventy-five degrees Fahrenheit, controller 30 substantially prevents electrical power to be sourced to either of the busses 48, 50 since there is very little likelihood of any frosting or any fogging being deposited or occurring upon the backwindow 20. However, if the measured ambient temperature is between about forty and about seventy-five degrees Fahrenheit, there could be fogging but not frosting on windows 20, 22, 24, and hence a certain fixed amount of electrical power may be applied to the respective regions of assembly 12 (e.g., a reduced amount of power is communicated to the grid 40 to or the individual portions 60, 62 to defog the windows 20, 22, 24). Lastly, if the measured ambient temperature is below about forty-five degrees Fahrenheit, the possibility of frosting/snow being deposited or occurring upon windows 20, 22, 24, is likely, and hence a greater amount of power may be applied by the grid 40 or to the individual portions 60, 62. It should be understood that nothing in this description is meant to limit the type and/or placement of temperature sensor 49 and that the foregoing operation may be accomplished by the controller 30 in a substantially automatic manner (e.g., without human intervention).

Figure 3:
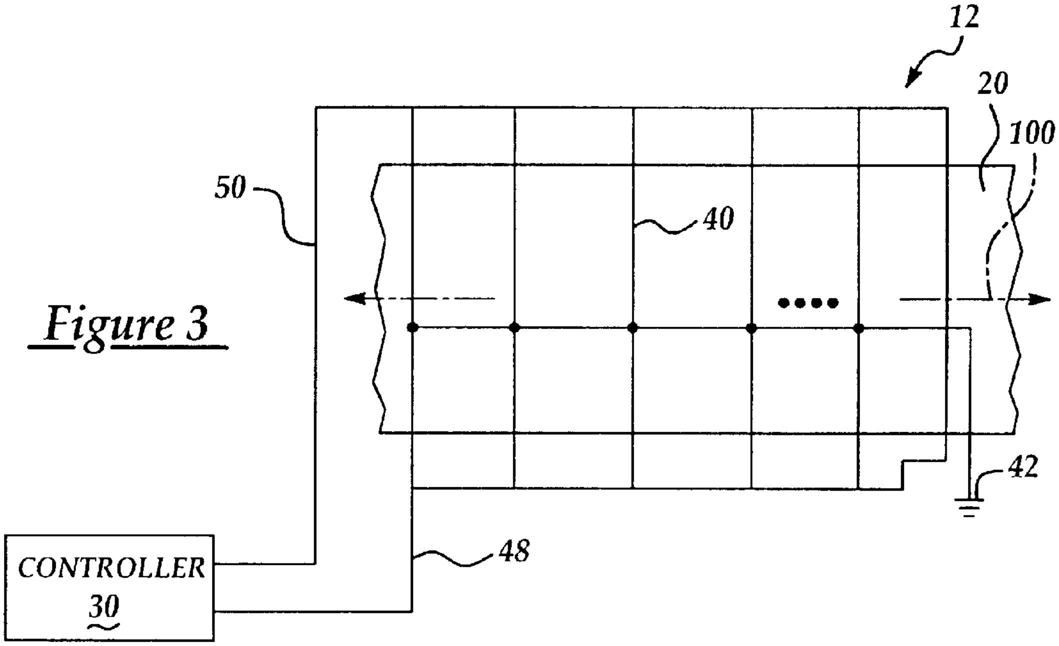
FIG. 3 is an electrical schematic diagram of an apparatus which is made in accordance with the teachings of an alternate embodiment of the invention.

It should be appreciated that conductors 40 may form substantially any desired pattern upon or within the windows 20, 22, and 24, such as the horizontal pattern which is shown in FIG. 2 (i.e., a pattern in which the conductors 40 are substantially parallel to the respective longitudinal axis of symmetry 100 of the window 20, 22, 24 upon which or in which they are deployed). As shown best in FIG. 3, these conductors 40 may also be vertically deployed upon or within the window 20, 22 and 24 (i.e., being substantially perpendicular to the respective longitudinal axis of symmetry 100 of the window 20, 22, 24 upon or in which they are deployed). It should also be appreciated that conductors 40 may be coupled to electrical ground potential 42 at substantially any desired point or location along their respective length.

Hence, in the foregoing non-limiting embodiments, conductors 40 form two selectively energizable assemblies and respectively have two separate energization paths. When bus 50 is physically and communicatively coupled to the battery 26 a first energy path is formed in each conductor 40 from each respective end 44 to the electrical ground potential 42, through bus 47. This respective first energy path which is associated with or provided by each conductor 40 cooperatively forms a first heating or energization assembly 60 which selectively heats a first half or portion of backwindow 20. When bus 48 is physically and communicatively coupled to the battery 26 a second energy path is formed in each conductor 40 from each respective end 46 to the electrical ground potential 42, through the bus 47. This respective second energy path associated with or provided by each conductor 40 cooperatively forms a second heating or energization assembly 62 which selectively heats the second half or portion of the backwindow 20.

This alternating activation of the busses 48 and 50 allows a greater amount of energy to be communicated to the windows 20, 22, 24 from the battery or energy source 26 since this methodology allows or provides alternating inputs or pulses of energy to these conductors 40. The benefit provided by such pulsed energy is explained in greater detail below.

It is known in the art that the resistance of a grid or array of conductors increases over the length of time in which electrical current is communicated to it, thereby causing the amount of electrical current, which travels through the conductors 40, to rapidly or exponentially deteriorate, thereby substantially reducing the amount of heat which is communicated to the backwindow 20 and inefficiently defrosting the backwindow 20 (e.g., this increased resistance increases the amount of time required to defrost the backwindow 20). Particularly this increase in resistance may be generally calculated by use of the following equation:

$$R(T)=R(T0)*(1+\text{Alpha}*(\text{Delta } T)) \quad \text{(equation 1)}$$

Where, R(T) is the grid resistance (e.g., the resistance of the coupled array or grid of conductors 40) at a certain ambient temperature T; R(T0) is the grid resistance at a known temperature of T0; Alpha is the temperature coefficient of the material used to make the conductors 40 and is a known quantity; and Delta T=(T−T0) and is equal to the difference between the temperature of T and the temperature of T0 Hence, as the conductors 40 receive energy and become hot, their resistance increases by an amount proportional to (1+Alpha (Delta T)).

Further, according to Ohm's law:

$$I=V/R(T) \quad \text{(equation 2)}$$

Where V denotes the voltage communicated to the array or grid of conductors 40 and, more particularly, is typically equal to twelve volts (i.e., a possible voltage of battery 26); and I is the amount of electrical current traversing the grid of conductors 40.

Hence, the amount of electrical current is inversely proportional to the resistance of the conductors 40. Moreover, by use of equations 1 and 2, a model may be made of the change in current and resistance as the temperature of the conductors 40 increases. That is, assuming a known and constant source of voltage V and a sensed or calculated ambient temperature which allows the calculation of R(T) to be made, one may calculate the resultant current I. By initially sensing the conductor temperature (e.g., by use of sensor 49), the controller 30 may automatically cause power being supplied to the first portion 60 to be interrupted and to cause the power to be communicated to the second portion 62 before the resistance of the conductors 40 within the first portion 60 appreciably increases. Such an energy interruption methodology may also be applied to portion 62.

In another non-limiting embodiment, controller 30 may automatically cause power to be interrupted to the portions 60, 62 when the respective resultant current I drops below a certain threshold amount (e.g., below 18 amperes), thereby obviating the need for a temperature sensor 49. Furthermore, the use of a bi-metal strip or assembly which is disposed right at the backwindow 20 and which may be coupled to controller 30 may be utilized to accomplish both the switching between the different regions 60, 62 of the windows 20, 22, 24 as well as controlling/determining the need to engage the defroster (e.g., if the temperature is above 75 degrees Fahrenheit, a bi-metal assembly could be used to interrupt power to the defroster).

The rapid pulsing, required by the preferred embodiment of the invention, allows greater amounts of such electrical current and heating power to be generated by the conductors 40 during an interval of time, since the pulses have a width or a duration which corresponds to the time during which changes in resistance of the conductors 40 are minimized. For example, a pulse width of between five and thirty seconds allows a current of between 18 to about 20 amperes to traverse the conductors 40 without appreciably raising the temperature of the conductors 40 above T0. Further, since the two heating assemblies or portions 60, 62 are not concurrently operated, a conventional twelve volt vehicular battery, or substantially any other desired vehicular battery may be utilized since each assembly 60, 62 only utilizes the voltage and current provided by a conventional vehicular battery 26 to effectively defrost backwindow 20. This is graphically shown by graph 80 of FIG. 4.

Figure 4:
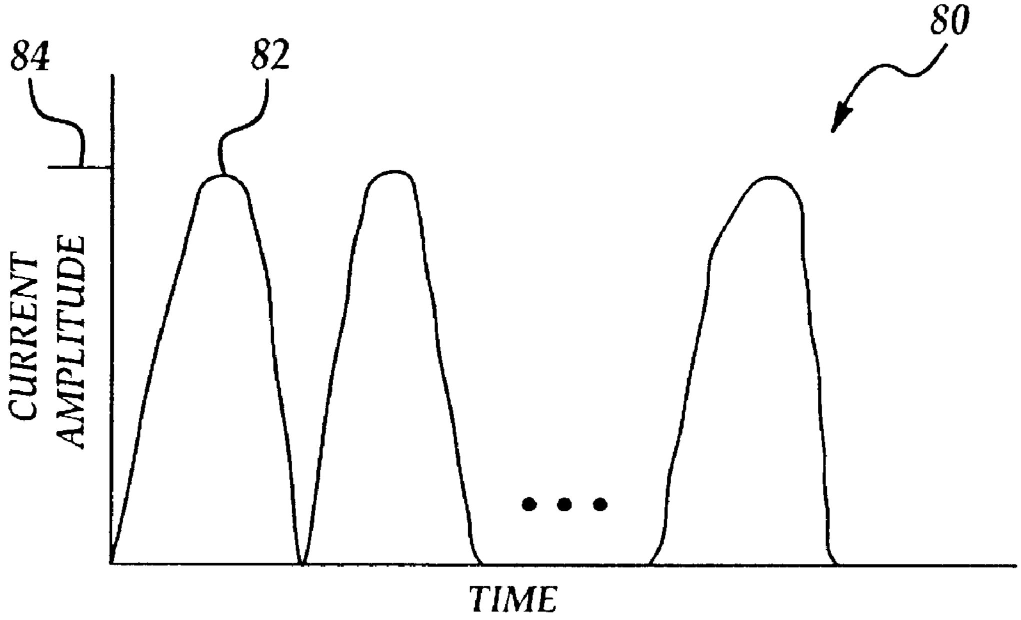
FIG. 4 is a graphical pulse diagram illustrating the excitation energy pulses which are used by the apparatus of the preferred embodiment of the invention.

As shown in FIG. 4, each of the provided pulses 82 which are communicated, to a conductors 40, delivers a substantially identical amplitude of current 84 (e.g., about 18 to about 20 amperes). By increasing the number of such pulses 82 which are delivered to a conductor 40 during an interval of time, one may increase the amount of electrical power which travels through the conductors 40 over that which occurs during a substantially uninterrupted communication of electrical energy to the conductors 40 during the same interval of time. Since the relatively large amount of short duration type pulses (e.g., occurring at a frequency of 30 hertz) allows a relatively large amount of electrical current to flow through these conductors 40. The increased electrical current, which will be deployed and utilized after the windows 20, 22, 24 have reached a pre-specified temperature value, provides increasing heat which allows the backwindow 20 to be defrosted very quickly. Furthermore, until a certain temperature is reached, power is constantly added at the highest possible power density (i.e., power is added at the highest possible level, in watts per square meter). Moreover, a surface, such as windows 20, 22, 24, requires a certain amount of time to cool. Hence, the heat generated by a pulse will not be immediately dissipated. Therefore pulses 82 may not need to frequently occur and in one non-limiting embodiment, a subsequent pulse 82 is not produced and is not communicated to the conductors 40 until the portion of the window 20, 22, 24 has cooled by a certain amount (e.g., by about two degrees) since a prior pulse 82 was communicated to these conductors 40.

In other non-limiting embodiments, sensors (not shown) may be adapted to automatically identify defrosted areas, communicate this information to controller 30, and have controller 30 automatically cause these defrosted areas to no longer be heated (i.e., to no longer receive electrical power). Another approach entails defrosting the center of the window and progressing towards the edges or from top to bottom in order to allow the melted ice to aid in the defrosting process.

It is to be understood that the invention is not limited to the exact construction or method which has been illustrated and discussed above, but that various changes and modifications may be made without departing from the spirit and the scope of the inventions as are more fully delineated in the following claims. One non-limiting example of such a modification is to provide an automatic defrost capability whereby controller 30 activates assembly 12 when the temperature of backwindow 20 drops below a certain threshold level. Controller 30 may monitor the backwindow 20 temperature through either temperature sensor 49 or by using the grid resistance of conductors 40 to estimate the temperature in the manner delineated above.

What is claimed is:

1. An apparatus for heating a window comprising:

a selectively movable switch which is movable from a first position to a second activated position;

an assembly which is coupled to said selectively movable switch and which provides controlled pulses of energy only when and for as long as said switch is in said second activated position;

a first portion which is communicatively coupled to said assembly and deployed upon a first part of said window, wherein said assembly communicates said controlled pulsed energy to said first portion and, in response to said receipt of said controlled pulsed energy, said first portion heats said first part of said window; and a second portion which is communicatively coupled to said assembly and deployed upon a second part of said window, wherein said assembly communicates said controlled pulsed energy to said second portion only after said first part of said window has been heated, thereby heating said second part of said window.

2. The apparatus of claim 1, wherein said second portion heats said second part of said window only when said first portion stops heating said first part of said window.

3. The apparatus of claim 1, wherein said first and second portions respectively heat said first and second parts of said window for a substantially identical period of time.

4. The apparatus of claim 1 wherein said first portion comprises a first part of at least one heating element which is disposed upon said first and said second part of said window and wherein said second portion comprises a second part of said at least one heating element.

5. The apparatus of claim 4, wherein said assembly comprises a battery; and a controller which is coupled to said battery and to said at least one heating element.

6. The apparatus of claim 5 wherein said switch is coupled to said controller and which selectively allows only said first part of said window to be heated.

7. The apparatus of claim 6, wherein said switch further selectively allows only said second part of said window to be heated.

8. The apparatus of claim 6 further comprising a temperature sensor which senses a certain temperature and causes said first part to be heated based upon said sensed temperature.

9. The apparatus of claim 8, wherein said first part of said window comprises the middle portion of said window and wherein said second part of said window comprises an edge of said window.

10. An assembly for heating a portion of a vehicle comprising:

a selectively movable switch which is movable from a first position to a second activated position;

a plurality of conductors which heatingly communicate with said portion of said vehicle, each of said plurality of conductors being coupled to an electrical ground potential and including a first portion which selectively receives pulsed energy and which produces heat by use of said pulsed energy only when and for as long as said selectively movable switch is in said second activated position;

a control assembly which estimates the temperature of said portion of said vehicle by determining the resistance of said pulsed energy, said control assembly further storing a threshold temperature level and, upon said first portion reaching said stored threshold temperature level, said control assembly interrupting said communication of pulsed energy to said first portion; and a second portion which selectively receives said pulsed energy and which produces heat by use of said pulsed energy only when and for as long as said selectively movable switch is in said second activated position and only when said communication of said pulsed energy to said first portion is interrupted by said control assembly.

11. The assembly of claim 10 further comprising a controller which is coupled to said plurality of conductors and which senses the resistance of said second portion and which interrupts said communication of said energy to said second portion based upon said sensed resistance.

12. The assembly of claim 11 further comprising a temperature sensor which is coupled to said portion of said vehicle and to said controller.

13. The assembly of claim 12, wherein said temperature sensor senses the temperature of said portion of said vehicle and, based upon said sensed temperature, interrupts said communication of said energy to said second portion.

14. The assembly of claim 13, wherein said vehicle resides within a certain environment, said assembly further comprising a second temperature sensor which senses the temperature of the environment within which the vehicle resides and, based upon said sensed temperature, causes energy to be communicated to said second portion.

15. The assembly of claim 14, wherein said portion comprises a window.

16. A method for heating a vehicular window comprising the steps of:

providing a battery;

providing a selectively movable switch which is movable from a first position to a second activated position;

providing a control assembly and coupling said control assembly to said battery and to said selectively movable switch, wherein said control assembly causes said battery to emit pulsed energy only when and for as long as said switch is in said second activated position;

providing a first plurality of conductors and coupling said first plurality of conductors to said battery, said first plurality of conductors receiving said controlled pulsed energy from said battery and, upon reception of said pulsed energy, said first plurality of conductors producing heat only when and for as long as said selectively movable switch is in said second activated position, wherein said control assembly further interrupts said communication of said controlled pulsed energy to said first plurality of conductors only upon a determination that said first plurality of conductors have reached a certain threshold level; and providing a second plurality of conductors, said second plurality of conductors only receiving said controlled pulsed energy from said battery after said control assembly has interrupted said controlled pulsed energy to said first plurality of conductors and, in response to said received pulsed energy, said second plurality of conductors selectively produce heat only when and for as long as said selectively movable switch is in said second activated position.

17. The method of claim 16 wherein said method further comprises the step of coupling each of said first and each of said second plurality of conductors to electrical ground potential, thereby forming a pair of distinct energy transport paths within each of said first and each of said second plurality of conductors, whereby a first of each of said pair of distinct energy paths cooperatively form a first defrosting assembly and whereby a second of each of said pair of respective and distinct energy paths cooperatively form a second defrosting assembly.

18. The method of claim 17 further comprising the step of communicating energy to said first defrosting assembly only until the resistance of said first of said pair of energy paths begin to substantially rise.

19. The method of claim 18 further comprising the steps of sensing the temperature of said window; and preventing the communication of energy to said first and second energy paths based upon said sensed temperature.

20. The method of claim 18 further comprising the step of sensing an ambient temperature and causing a certain amount of energy to be communicated to said first energy path based upon said sensed temperature.

* * * * *